United States Patent [19]

Mazier

[11] 3,909,782

[45] Sept. 30, 1975

[54] METHOD AND DEVICE FOR CONTROL OF THE TRANSMISSION OF DATA EXCHANGED BETWEEN A CONTROL PROCESSOR AND A PLURALITY OF PERIPHERAL DEVICES

[75] Inventor: Claude Marie Gaston Jacques Mazier, Paris, France

[73] Assignee: Compagnie Honeywell Bull, Paris, France

[22] Filed: Aug. 27, 1974

[21] Appl. No.: 500,994

[30] Foreign Application Priority Data

Sept. 3, 1973 France .............................. 73.31760

[52] U.S. Cl. .................. 340/146.1 R; 340/146.1 AG; 340/146.1 C; 340/146.1 D

[51] Int. Cl.[2] ...................... G08C 25/02; H04L 1/16

[58] Field of Search......... 340/146.1 AG, 146.1 AL, 340/146.1 C, 146.1 D, 146.1 R, 147 LP, 147 SY, 163, 172.5

[56] References Cited

UNITED STATES PATENTS 3,579,200 5/1971 Davis et al. ...................... 340/172.5

*Primary Examiner*—R. Stephen Dildine, Jr.
*Attorney, Agent, or Firm*—David A. Frank; Ronald T. Reiling

[57] ABSTRACT

A method for checking and transmitting data between a central processor and peripheral devices. The exchange is a two-step procedure. The first step is for transmission of address information, the second for the data exchange. Each exchange is checked as part of its transmission. A device for effecting this method is described.

15 Claims, 7 Drawing Figures

METHOD AND DEVICE FOR CONTROL OF THE TRANSMISSION OF DATA EXCHANGED BETWEEN A CONTROL PROCESSOR AND A PLURALITY OF PERIPHERAL DEVICES

BACKGROUND OF THE INVENTION

1. Field of the Invention

The present invention relates to control of transmission of data within a computer system and more specifically to exchange of data between a central processor and one or a number of peripheral devices.

2. Description of the Prior Art

In the present state of the art, the transmission of data between a central processor and various peripheral devices attached to it is controlled by a cycle of two signal sequences:

1. a first signal sequence enabling the transfer of data address information; and
2. a second signal sequence enabling the transfer of data to the address defined in the course of the first sequence In general only the latter sequence is followed by a check of the data transferred.

Interfaces employed for the transmission of the data are of two types. First, there are those known as multiple-channel interfaces which comprise a logic portion to which are connected different transmission channels, each channel being specifically for one peripheral. Second, there are those known as star interfaces which comprise a logic portion for each peripheral connected to the computer. The two types of interfaces cited (and the methods they employ) are those most commonly used at present. However, they display important disadvantages. Multiple-channel interfaces do not enable connection of peripherals at a great distance from the computer. In addition, a breakdown at the level of the logic portion of the interface affects all of the peripherals. Star interfaces pose problems of synchronization which cause the problem of distance to become critical. Since it is the peripheral which, in general, makes decisions on the interface which can lead to conflicts within the central processor, there is a need for circuits for checking the sequentiality of the functions being dealt with by the peripherals.

Also, there is complexity of the logic portions connected to each channel. These factors lead to no visibility of the contents of the registers nor of the elementary functions of the peripheral, which are masked by the interface. This leads to great difficulty in the event of breakdown of the peripheral. Finally, during the transmission of data the addressing of the data is not followed by a check.

OBJECTS OF THE INVENTION

It is an object of the present invention, therefore, to provide a method of control of the transmission of data exchanged between a central processor and one or a number of peripherals.

It is another object of the present invention to provide a method and a device for the control of the transmission of data between a central processor and at least one peripheral unit through a transmission channel.

It is still another object of the invention to provide a method and device for controlling the exchange of information between a central processor and a plurality of peripheral devices, which is dependent upon neither the power of the central processor nor the nature of the peripherals.

Other objects and advantages of the invention will become apparent upon reading the description of the preferred embodiment in relation to the attached drawings.

SUMMARY OF THE INVENTION

The method comprises a cycle of signals consisting of two sequences. A first sequence is a data transmission demand sequence. This sequence comprises information concerning the direction of the exchange and the addressing of the data. A second sequence is a data transmission sequence. The method is characterized by the fact that these first and second sequences are each followed by an intermediate check sequence.

The device effects the method described above. It is comprised of a first data transmission control circuit connected to the central processing unit and a second data transmission control circuit connected to a peripheral unit. These two circuits cooperate so as to transmit in both directions a cycle of control signals consisting of two signal sequences. The first is a data transmission demand signal sequence which contains information relative to the addressing of the data. The second sequence is for the transmission of these data through the transmission channel.

The device comprises at least one means for checking the information transmitted during the first sequence and the data transmitted during the second sequence. The checking means is connected to the second data transmission control circuit. One output from this second circuit controls a gate which enables passing of the data through the channel.

DESCRIPTION OF THE PREFERRED EMBODIMENT

Figure 1:
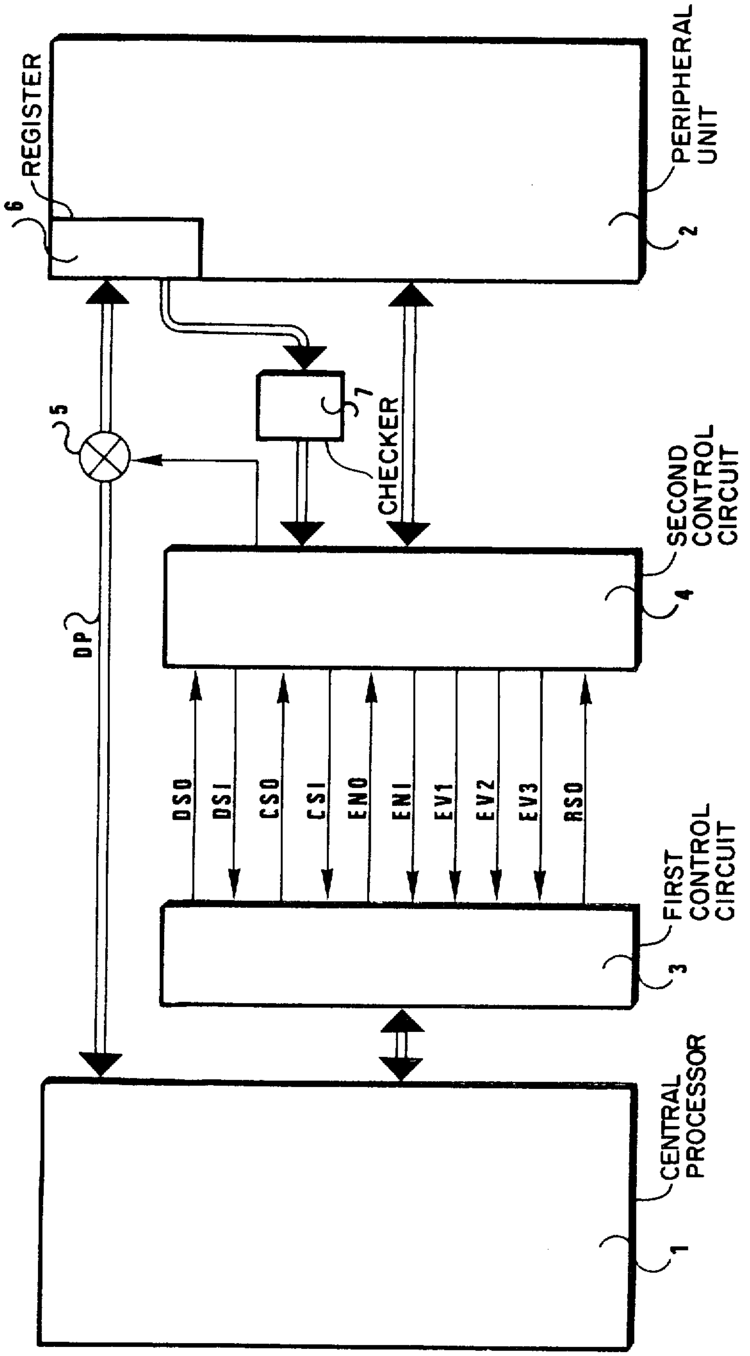
FIG. 1 is a general diagram of the device for control of the transmission of data exchanged between the central processor and a peripheral unit.

Referring now to FIG. 1 the various signals which are exchanged between the central processor 1 and a peripheral unit 2 pass between a first control circuit 3 connected to the central processor 1 and a second control circuit 4 connected to the peripheral unit 2. These signals can go from the central processor 1 towards the peripheral unit 2 in a direction known as the outwards or writer direction. This is the case with the signals DSO, CSO, ENO, RSO. Signals can also go from the peripheral unit 2 towards the central processor 1 in a direction known as the inwards or read direction. This is the case with the signals DSI, CSI, ENI, EV1, EV2, EV3. A gate 5 enables a transmission channel DP at certain instants, thereby allowing the flow of the information or data through the transmission channel DP. This validation depends in particular upon a check of the data recorded in a register 6 in the peripheral unit 2. This check is effected by means of a checker 7. It can be a check either of the parity or of the probability of the data transmitted. The transmission channel DP is bi-directional: data may be read from the peripheral unit 2 or data may be written in the peripheral unit 2 by the central processor 1. The various signals which are exchanged between the first circuit 3 and the second circuit 4 are logic signals of the level 0 or 1.

Figure 2:
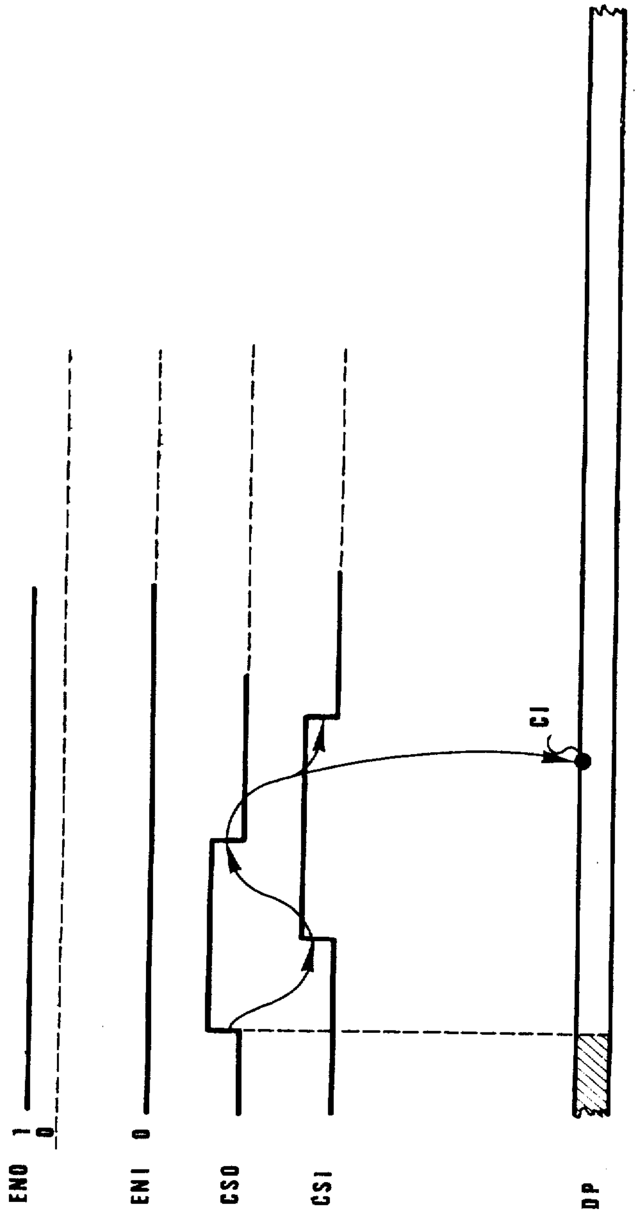
FIG. 2 is a representation of the control signals which occur during the first sequence of transmission of data between the central processor and a peripheral unit.

Referring now to FIG. 2, the various signals represented are exchanged between the first and second circuits during the first sequence of signals between the central processor and the peripheral unit. During this first sequence, only information concerning the addressing of the data to be read or written in the peripheral unit will be conveyed through the transmission channel DP. This sequence involves the probability or parity check of the address information in the following manner. A signal ENO (known as the outwards transfer signal) of logic level 1 is sent from the first to the second control circuit, while a signal ENI (known as the inwards transfer signal) of logic level 0 is sent from the second to the first circuit. A signal CSO (called the outwards check signal) of logic level 1, is generated by the first circuit when a data transmission is to be effected. At the appearance of this signal, the information concerning the addressing of the data is positioned at the input to the transmission channel DP. The second circuit detects the appearance of the signal CSO and generates a signal CSI (called the inwards check signal) of logic level 1, which is sent to the first circuit. After detection of the appearance of the signal CSI by the first circuit, the latter lets the signal CSO relapse to a logic level O. The data address information which was positioned at the input to the transmission channel DP can be transferred to the peripheral unit after enabling of the gate 5 in FIG. 1. A check of this information is effected. This check is represented by CI in FIG. 2. The relapse of the signal CSO is then detected by the second circuit which lets the signal CSI relapse to a logic level O. When this relapse is detected by the first circuit, the second sequence, the transfer of the data to the address defined by the address information in the first sequence, can be undertaken.

Figure 3:
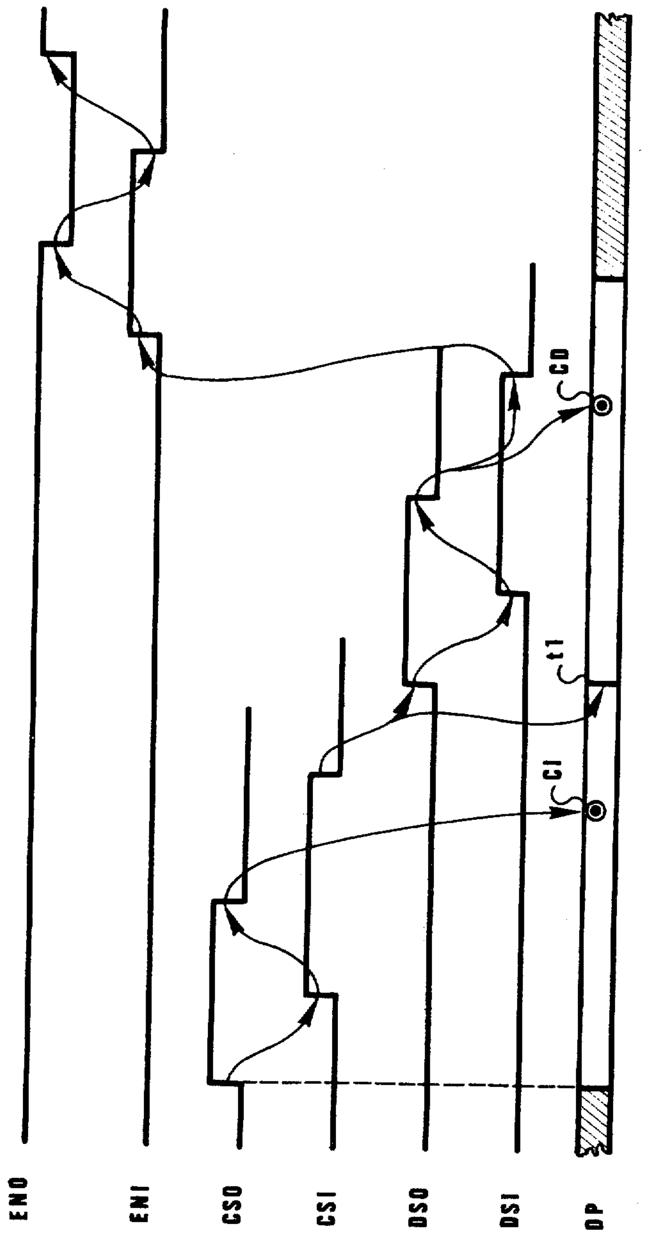
FIG. 3 is a representation of the signals which occur during the second sequence of transmission of the data in a direction known as the write direction and which goes from the central processor to a peripheral unit.

Referring to FIG. 3, control signals are exchanged during a second sequence of transmission of data from the central processor towards the peripheral unit in an exchange direction known as an outwards or write direction. This sequence takes place in the following manner. After relapse of the signal CSI and check and transfer of the address information, the data to be transferred are positioned at the input to the transmission channel DP at an instant of time $t_1$. The first circuit detects the relapse of the signal CSI and generates a signal DSO (known as the outwards sampling signal) of logic level 1. The appearance of the signal DSO is detected by the second circuit which generates a signal DSI (known as the inwards sampling signal) of logic level 1. The appearance of the signal DSI is detected by the first circuit which lets the signal DSO relapse to the logic level O. This relapse of the signal DSO is detected by the second circuit. The gate 5 in FIG. 1 is enabled, the peripheral unit records the data at the address which has been defined during the first sequence while a check of these data is effected at CD. Finally, the signal DSI relapses to the logic level O.

The relapse of the signal DSI is followed by a reappearance of the signal ENI. The reappearance of the signal ENI is detected by the first circuit which lets the signal ENO relapse. The relapse of the signal ENO is detected by the second circuit which lets the signal ENI relapse. Finally, the relapse of the signal ENI is detected by the first circuit which makes the signal ENO reappear. A new cycle of data transfer can then be undertaken.

Figure 4:
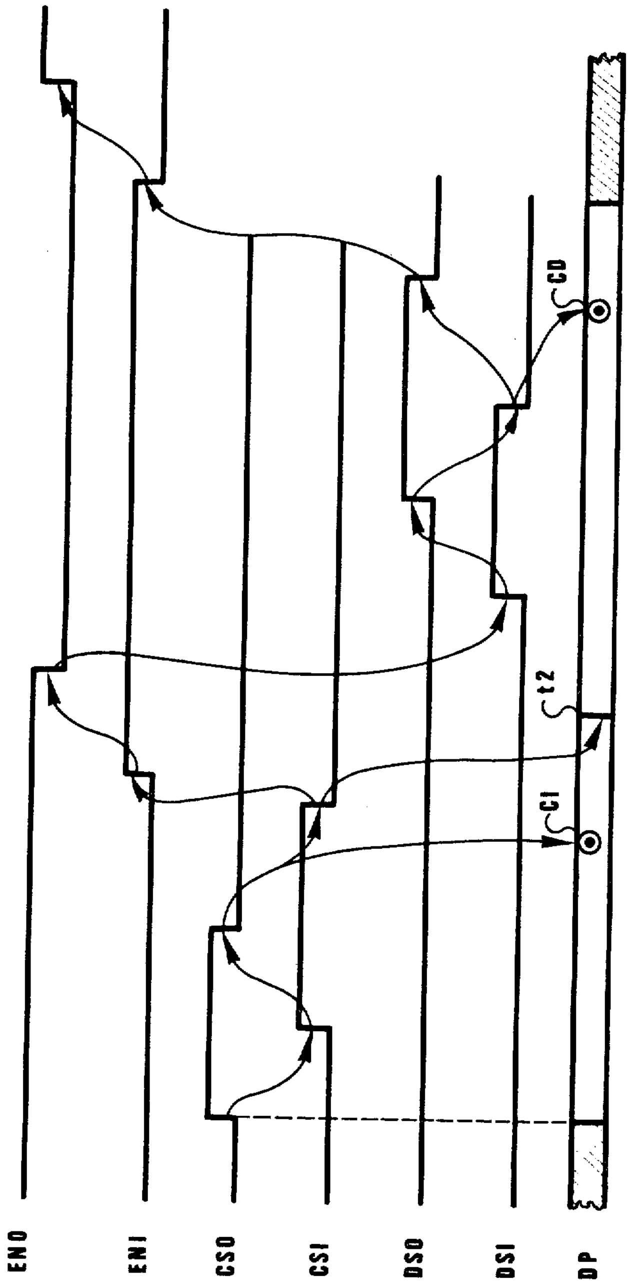
FIG. 4 is a representation of the signals which occur during the second sequence of transmission of the data in a direction known as the read direction and which goes from a peripheral unit to the central processor.

There will now be described, with reference to FIG. 4, the second sequence of transfer of data from the peripheral unit towards the central processor in a transfer direction called the inwards or read direction. This sequence takes place in the following manner.

As soon as the first circuit detects the relapse of the signal CSI, the signal ENI reappears and the data to be read at the address defined during the first sequence are positioned at the input to the transmission channel at the instant of time $t_2$. The appearance of the signal ENI is detected by the first circuit which then lets the signal ENO relapse. The relapse of the signal ENO is detected by the second circuit which then makes the signal DSI appear. The appearance of the signal DSI is detected by the first circuit which makes the signal DSO appear. This appearance of the signal DSO is detected by the second circuit which in turn lets the signal DSI relapse. This relapse of the signal DSI is detected by the first circuit. The gate 5 in FIG. 1 is enabled and the central processor records the data. The first circuit then lets the signal DSO relapse. The relapse of the signal DSO is detected by the second circuit which causes the relapse of the signal ENI. The relapse of the signal ENI is detected by the first circuit which makes the signal ENO reappear. A new data exchange cycle can then be undertaken.

Figure 5:
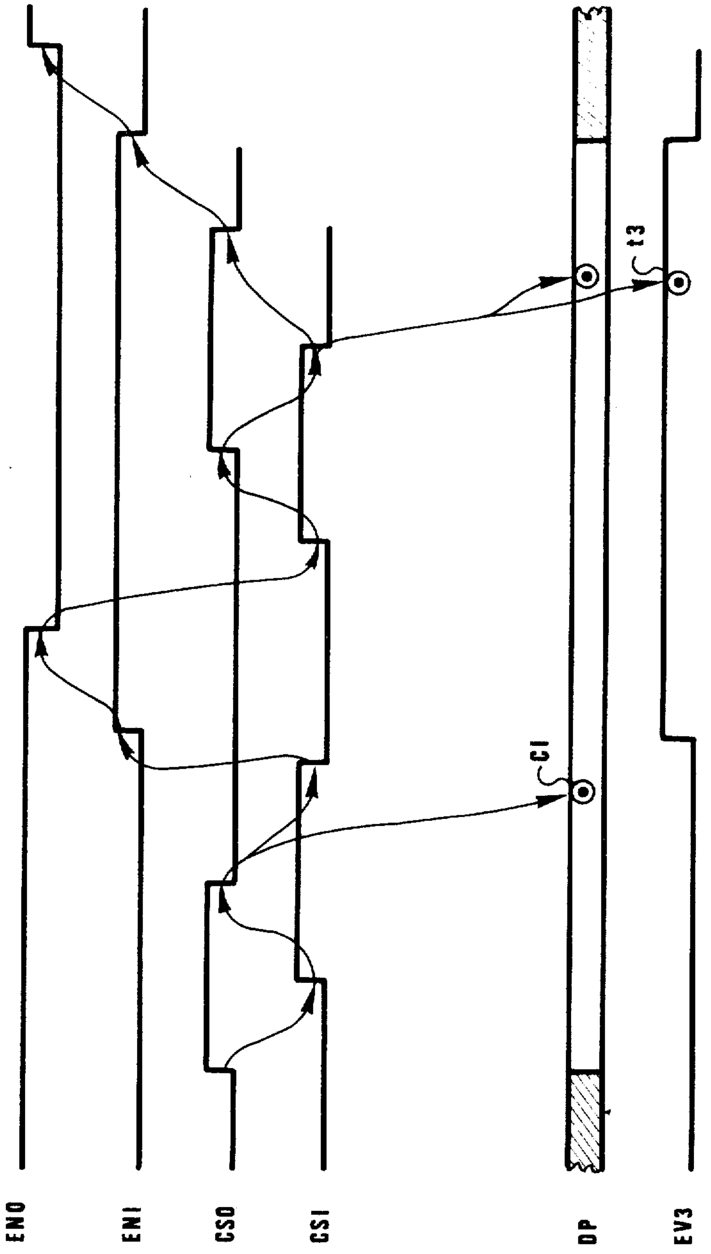
FIG. 5 is a representation of the control signals which occur when an error is detected in the address information of the data.

The various signals are exchanged between the first and second circuits in the course of the first sequence of signals of transmission of data have been described with respect to FIG. 2. Referring to FIG. 5, the case in which an error is detected in the address information, takes place in the following manner. If at the relapse of the signal CSI there is detection of an error in the address information, the second circuit lets the signal ENI reappear. The checking member generates an error signal EV3 of logic level 1. The reappearance of the signal ENI is then detected by the first circuit which lets the signal ENO relapse. The relapse of the signal ENO is detected by the second circuit, which makes the signal CSI reappear. The reappearance of the signal CSI is detected by the first circuit which makes the signal CSO reappear. This reappearance is detected by the second circuit which lets the signal CSI relapse. When the relapse of the signal CSI is detected by the first circuit at the instant of time $t_3$, the first circuit takes into account the logic state of the error signal EV3, which makes the signal CSO drop. The relapse of the signal CSO is detected by the second circuit which lets the signal ENI relapse. Finally, this relapse of ENI is detected by the first circuit which makes the signal ENO reappear.

Another cycle of data transmission control signals can then commence. It is then possible to repeat the same cycle as the first sequence, since the error of probability or parity are eliminated during this recovery interval.

Figure 6:
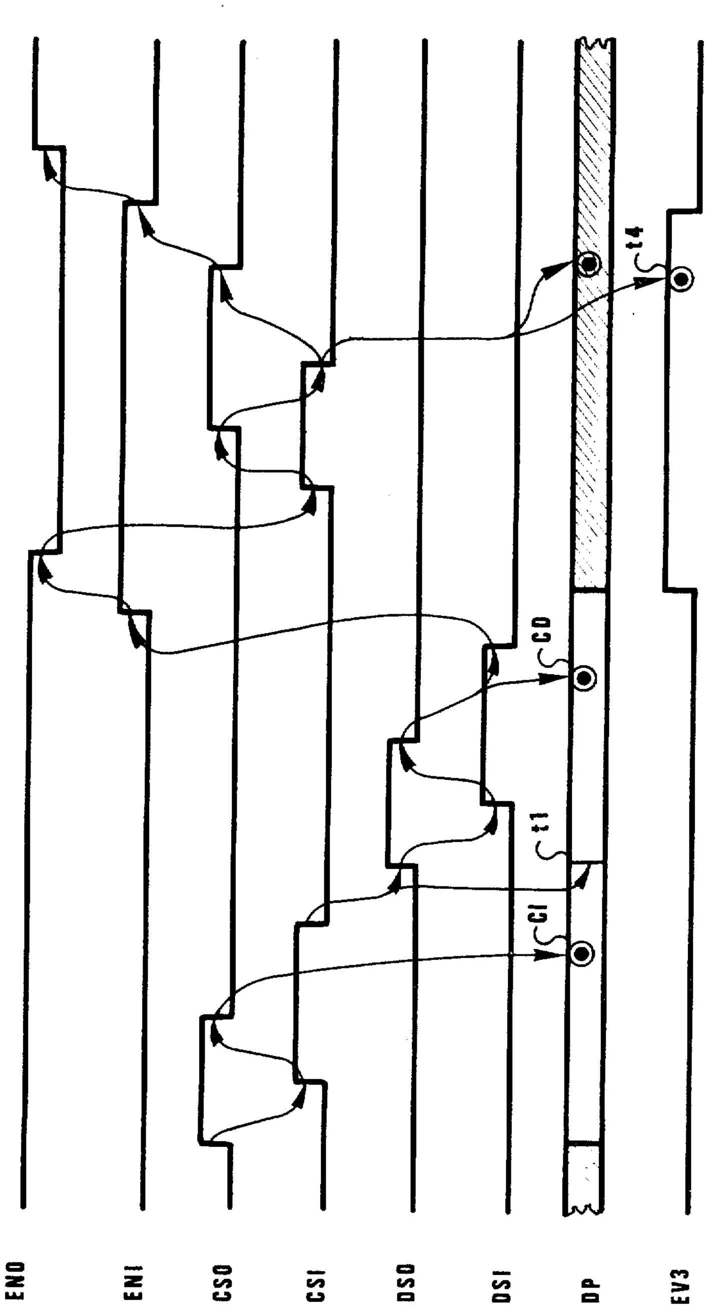
FIG. 6 is a representation of the signals which occur during the second sequence in the write direction when an error is detected in the data transmission.

Referring to FIG. 6, in the case in which an error is detected in the data transmitted to the peripheral unit, takes place in the following manner. After the relapse of the signal DSI and the recording of the data by the peripheral unit at an instant of time CD, if an error is detected in the data the second circuit makes the signal ENI reappear and generates an error signal EV3 of logic level 1. The reappearance of the signal ENI is detected by the first circuit which lets the signal ENO relapse. The relapse of the signal ENO is detected by the second circuit which then makes the signal CSI reappear. This reappearance of the signal CSI is detected by the first circuit which makes the signal CSO reappear. The reappearance of the signal CSO is detected by the second circuit which lets the signal CSI relapse. The relapse of the signal CSI is detected by the first circuit which takes into account at an instant of time $t_4$ the logic state of the error signal EV3 before letting the signal CSO relapse. Finally, the relapse of the signal CSO is detected by the second circuit, which makes the signal ENI relapse and then in turn the signal ENO reappear. The cycle can then recommence at the first sequence, for identical or different data.

It should be observed that the various sequences which have just been described do not show the signal RSO of FIG. 1. This signal (known as the initialization control signal) can occur at any instant in the data transmission control cycle. It is a signal which goes from the first to the second circuit. It occurs when the central processor seeks control of the interface. The signal RSO enables interrupting of the cycle which is in progress at any instant of time in the event of some difficulty. Restoration of the state of the register of the peripheral to zero is effected simultaneously.

There have likewise been represented in FIG. 1 signals EV1 and EV2 which are work demand priority signals from the peripheral. The signal EV1 can represent, for example, a work demand of higher priority than that which is represented by the signal EV2. These signals (the number of which has been limited to two for convenience of representation) are generated by the second circuit and controlled in turn by the peripheral unit. They are sent to the first circuit and then to the Central processor which memorizes these demands in accordance with their priority and order of arrival, in order that the highest priority order should be satisfied first.

There will now be described in a slightly more detailed fashion with reference to FIG. 7, the device for effecting the method previously described. The first circuit 3 comprises a first emitter 8 and a first receiver 9 which controls this emitter. The second circuit comprises a second receiver 10 which controls a second emitter 11. These emitters and receivers are connected so that the second receiver receives the signals from the first emitter and vice versa. Thus the first emitter 8 will send towards the second receiver 10 and the signals DSO, CSO, ENO, RSO, and the second emitter 11 will send towards the first receiver 9 the signals DSI, CSI, ENI, EVI, EV2, EV3. The emitters and receivers consist mainly of logic circuits. The checking member 7 controls the second emitter in such a way that the latter, in the event of an error either of probability or parity, generates the signal EV3 of logic level 1, to be taken into account by the first receiver.

The second emitter is also controlled by the peripheral unit so as to cause to arrive at the first receiver the signals of priority level EV1 and EV2. The order in which the work must be accomplished is then indexed and memorized by the central processor.

Figure 7:
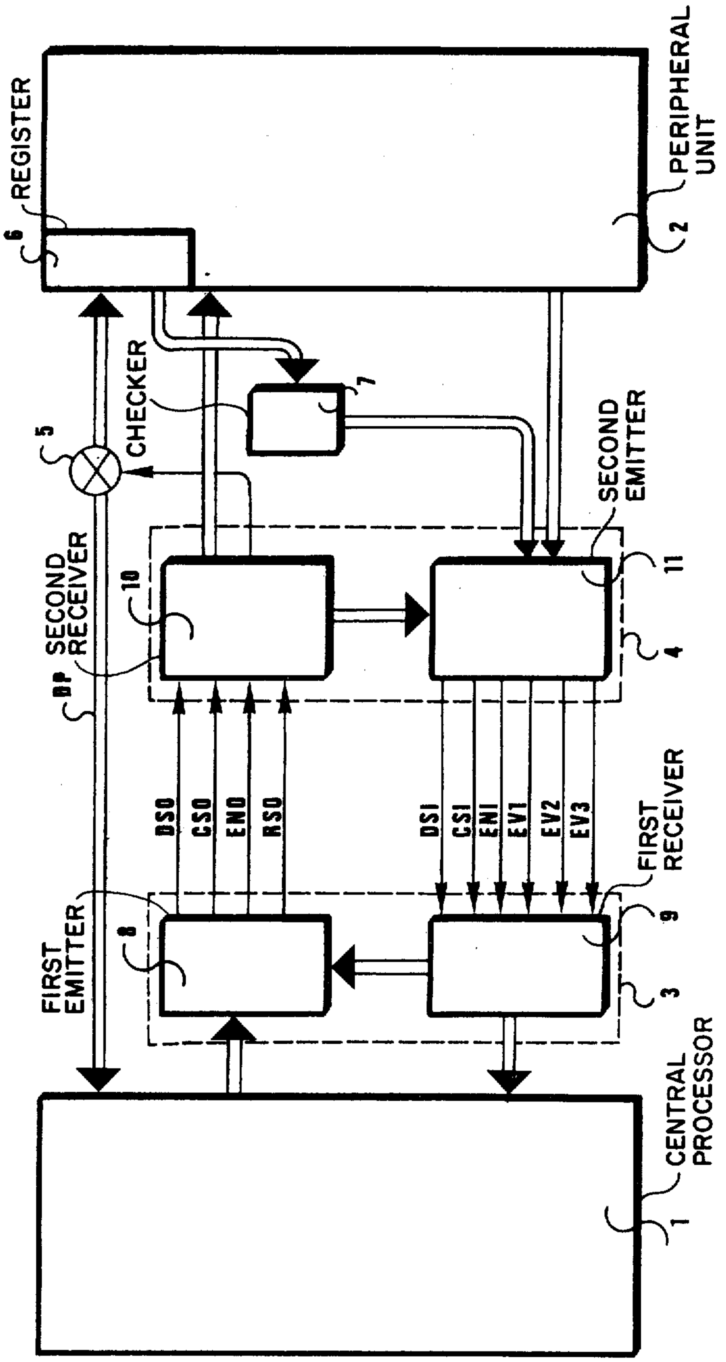
FIG. 7 is a more detailed diagram of a device for effecting the method represented by the five preceding Figures.

Also in FIG. 7 is a representation of the signal RSO which goes from the first emitter to the second receiver. This signal appears every time the central processor seeks control of the first emitter, for example, when a piece of work must be interrupted. The initialization signal RSO arrives at the second receiver and enables, at any instant, the stopping of the progress of the cycle of exchange and after enabling of the gate 5, the resetting to zero the state of the register 6 in the peripheral. The first and second emitters and first and second receivers will not be described in greater detail. In short, the various signals which they exchange have been described previously and the logic circuits which compose them are intended to produce or receive these various signals.

This method of control of data transmission between a peripheral unit and a central processor as well as the device for effecting this method procures a number of advantages. Firstly, there is no special regulation of the elements of the device as a function of the distance between the peripheral and the central processor. In fact, the phasing of the various signals is effected automatically due to the locking of the check signals CSI and CSO: when one of these signals appears it causes the appearance of the other and similarly the relapse of the two signals are interlocked. Secondly, there is no problem of transmission of synchronization signals. Such problems are generally confounded by the distance between the central processor and the peripheral unit. Thirdly, the two intermediate checking sequences enable instantaneous knowledge of satisfactory running of the device. Fourthly, the device is "transparent" to the information and to the data, since this information and data is conveyed by the transmission channel without undergoing modification in passing through the various logic circuits. Perfect visibility is thus obtained of the various registers that the peripheral can contain. This enables the central processor to diagnose the functional difficulties of the peripheral, to simulate elementary operations, and to recover the information resulting from this simulation. Fifthyl, the central processor is entirely master of the transmission due to the priority signals EV1 and EV2. These signals avoid problems of overloading, particularly when a transmission of data must be carried out between the peripheral and the central processor. The central processor may be connected to a number of peripherals and serves the peripheral in question as a function of external contingencies. Sixthly, the central processor can read or partially modify the state of a register in the peripheral or read a whole block of data. Finally, the speed of transmission of the data can be modified as a function of the peripheral which is connected to the central processor without necessitating adjustment of the interface.

It is clear that in the method which has just been described, one operation could be replaced by an equivalent operation, and that, in the device, one means could be replaced by a means producing the same technical functions, without departing from the scope of the invention.

What is claimed is:

1. A method of control of transmission of data exchanged between a central processor and at least one peripheral unit through a transmission channel, said method comprising:

sending a cycle of signals in two sequences, said sequences comprising:

sending a first data transmission demand sequence comprising information relative to the direction of the transmission and the addressing of the data to be transmitted; and sending a second data transmission sequence; wherein said first data transmission demand sequence comprises:

sending a so-called outwards transfer signal from the central processor to the peripheral unit, said outwards transfer signal fixing the direction of the data exchange;

sending a so-called outwards check signal, while positioning information concerning the addressing of the data at an input to said channel by the central processor;

detecting the appearance of the outwards check signal and sending a so-called inwards check signal to the central processor;

detecting the inwards check signal and causing the outwards check signal to relapse;

detecting the relapse of the outwards check signal;

transmitting said address to the peripheral unit through said transmission channel;

effecting a check of said address information; causing the inwards check signal to relapse; and detecting the relapse of the inwards check signal whereby the cycle can recommence.

2. A method of data transmission control as recited in claim 1, whereby in the event of detection of an error in the data transmission demand information, the first data transmission demand sequence further comprises:

detecting the relapse of the inwards check signal;

sending a so-called inwards transfer signal to the central processor and generating an error signal;

detecting the inwards transfer signal and causing the outwards transfer signal to relapse;

detecting the relapse of the outwards transfer signal and causing the inwards check signal to appear;

detecting the reappearance of the inwards check signal and causing the outwards check signal to appear;

detecting the reappearance of the outwards check signal and causing the inwards check signal to relapse;

detecting the relapse of the inwards check signal which causes the central processor to account for the error signal and causing the outwards check signal to relapse;

detecting the relapse of the outwards check signal and causing the inwards transfer signal to relapse; and detecting the relapse of the inwards transfer signal and making the outwards transfer signal reappear, whereby a new cycle can be undertaken.

3. A method of data transmission control as recited in claim 1, whereby in the course of data transmission each peripheral unit can interrupt a data transmission, wherein said method comprises causing to arrive at the central processor a signal representing a data transmission demand of higher priority than that of the data transmission in progress.

4. A method of data transmission control as recited in claim 1 further comprising the initialization of the cycle at any instant of time by the generation of an initialization control signal.

5. A method of control of transmission of data exchanged between a central processor and at least one peripheral unit through a transmission channel, said method comprising:

sending a cycle of signals in two sequences, said sequences comprising:

sending a first data transmission demand sequence comprising information relative to the direction of the transmission and the addressing of the data to be transmitted; and sending a second data transmission sequence; wherein said second data transmission sequence for a so-called outwards or write exchange direction from the central processor to the peripheral unit comprises:

detecting the fall of a so-called inwards check signal at the end of the first data sequence, positioning the data to be transmitted to the peripheral unit at an input to the channel while generating a so-called outwards sampling signal;

detecting the appearance of the outwards sampling signal and generating a so-called inwards sampling signal;

detecting the appearance of the inwards sampling signal and causing the outwards sampling signal to relapse;

detecting the relapse of the outwards sampling signal;

effecting a check of the data and recording the data at the address in the peripheral unit specified during the first sequence;

causing the inwards sampling signal to relapse and causing a so-called inwards transfer signal to appear;

detecting the appearance of the inwards transfer signal and causing a so-called outwards transfer signal to fall;

detecting the fall of the outwards transfer signal and causing the inwards transfer signal to relapse; and detecting the relapse of the inwards transfer signal which causes the outward transfer signal to reappear whereby a new cycle can be undertaken.

6. A method of data transmission control as recited in claim 5, whereby in the course of the second so-called write sequence after the recording of the data in the peripheral unit, and after the detection of an error in the data, said write sequence comprises:

causing the inwards sampling signal to relapse and causing the inwards tranfer signal to appear and also causing an error signal to appear;

detecting the appearance of the inwards transfer signal and causing the outwards transfer signal to fall;

detecting the fall of the outwards transfer signal and causing a so-called inwards check signal to appear;

detecting the appearance of the inwards check signal and causing a so-called outwards check signal to appear;

detecting the appearance of the outwards check signal and causing the inwards check signal to relapse;

detecting the fall of the inwards check signal which causes the central processor to account for the error signal, causing the outwards check signal to relapse; and detecting the relapse of the outwards check signal and causing the inwards transfer signal to relapse and the outwards transfer signal to reappear whereby a new cycle can be undertaken.

7. A method of data transmission control as recited in claim 5 further comprising the initialization of the cycle at any instant of time by the generation of an initialization control signal.

8. A method of control of transmission of data exchanged between a central processor and at least one peripheral unit through a transmission channel, said method comprising:

sending a cycle of signals in two sequences, said sequences comprising:

sending a first data transmission demand sequence comprising information relative to the direction of the transmission and the addressing of the data to be transmitted; and sending a second data transmission sequence; wherein said second data transmission sequence for a so-called inwards or read exchange direction from the peripheral unit to the central processor comprises: detecting the fall of a so-called inwards check signal;

positioning the data to be transferred from the address in the peripheral unit defined during the first sequence at an input to the channel;

causing a so-called inwards transfer signal to appear causing a so-called outwards transfer signal to fall;

detecting the fall of the outwards transfer signal and causing a so-called inwards sampling signal to appear;

detecting the appearance of the inwards sampling signal and causing a so-called outwards sampling signal to appear;

detecting the appearance of the outwards sampling signal and causing the inwards sampling signal to relapse;

detecting the relapse of the inwards sampling signal;

recording the data in the central processor and causing the outwards sampling signal to relapse; and detecting the relapse of the outwards sampling signal which causes the inwards transfer signal to relapse and the outwards transfer signal to reappear whereby a new cycle can be undertaken.

9. A method of data transmission control as recited in claim 8 further comprising the initialization of the cycle at any instant of time by the generation of an initialization control signal.

10. A device for control of transmission of data between a central processor and at least one peripheral unit through a transmission channel, said device comprising:

a first data transmission control circuit connected to said central processor, said first circuit including a first emitter and a first receiver;

a second data transmission control circuit connected to a peripheral unit, said second circuit including a second emitter and a second receiver;

said first emitter coupled to said second receiver for sending control signals to said second receiver in a so-called outwards or write direction, said second emitter coupled to said first receiver for sending control signals to said first receiver in a so-called inwards or read direction, said first and second circuits cooperating so as to exchange a cycle of data transmission control signals comprising:

a first sequence comprising information relative to the direction of the transmission and the addressing of the data to be transmitted, and a second sequence of transmission of these data through said transmission channel;

first means for checking data transmitted in said write direction and for signaling said second emitter to send to said first receiver an error signal which causes an initialization of said cycle of control signals; and second means responsive to said second emitter for enabling the passage of the information or the data through said channel; wherein said emitters and receivers cooperate to exchange signals during said first sequence said cooperation comprising:

said first emitter sends a so-called outwards transfer signal to said second receiver during the whole of said first sequence, while the second emitter keeps a so-called inwards transfer signal at a low level during the whole of said first sequence, said transfer signals for fixing the direction of the exchange;

said first emitter generates a so-called outwards check signal, while the information concerning the addressing of the data is positioned at an input to said channel;

said second receiver detects the appearance of the outwards check signal and causes said second emitter to generate a so-called inwards check signal;

said first receiver detects the appearance of the inwards check signal and causes said first emitter to let the outwards check signal relapse;

said second receiver detects the relapse of the outwards check signal and signals said second means to enable the passage of data, whereby the addressing information is received by the peripheral unit while the first means simultaneously checks the information;

the second emitter causes the inwards check signal to relapse, and said first receiver detects the relapse of the inwards check signal whereby the cycle can recommence.

11. A device as recited in claim 10, whereby said emitters and said receivers cooperate to exchange signals during the first sequence when the first means detects an error in the information sent to the peripheral unit, said cooperation comprising:

said second emitter while causing the inwards check signal to relapse, also causes the inwards transfer signal reappear and also generates an error signal;

said first receiver detects the appearance of the inwards transfer signal and causes the first emitter to let the outwards transfer signal fall;

said second receiver detects the fall of the outwards transfer signal and causes the second emitter to make the inwards check signal reappear;

said first receiver detects the reappearance of the inwards check signal and causes the first emitter to make the outwards check signal reappear;

said second receiver detects the reappearance of the outwards check signal and causes the second emitter to let the inwards check signal relapse;

said first receiver detects the relapse of the inwards check signal and allows the central processor to receive the error signal; said first receiver causes the first emitter to let the outwards check signal relapse;

said second receiver detects the relapse of the outwards check signal and causes the second emitter to let the inwards transfer signal relapse;

said first receiver detects the relapse of the inwards transfer signal and causes the first emitter to make the outwards transfer signal reappear whereby a new cycle can be undertaken.

12. A device as recited in claim 11 comprising said first receiver having an input suitable for receiving a data transmission interruption signal from the peripheral unit, said interruption signal being representative of a level of priority higher than the level of priority of the transmission in progress.

13. A device for control of transmission of data between a central processor and at least one peripheral unit through a transmission channel, said device comprising:

a first data transmission control circuit connected to said central processor, said first circuit including a first emitter and a first receiver;

a second data transmission control circuit connected to a peripheral unit, said second circuit including a second emitter and a second receiver;

said first emitter coupled to said second receiver for sending control signals to said second receiver in a so-called outwards or write direction, said second emitter coupled to said first receiver for sending control signals to said first receiver in a so-called inwards or read direction, said first and second circuits cooperating so as to exchange a cycle of data transmission control signals comprising:

a first sequence comprising information relative to the direction of the transmission and the addressing of the data to be transmitted, and a second sequence of transmission of these data through said transmission channel;

first means for checking data transmitted in said write direction and for signaling said second emitter to send to said first receiver an error signal which causes an initialization of said cycle of control signals; and second means responsive to said second emitter for enabling the passage of the information or the data through said channel; wherein said emitter and said receivers cooperate to exchange signals during said second sequence in a direction of data exchange known as the outwards or write directions, said cooperation comprising:

the first receiver detecting the fall of a so-called inwards check signal at the end of the first sequence;

said first receiver causing said first emitter to generate a so-called outwards sampling signal while the data to be transferred is positioned at an input to the channel;

said second receiver detects the appearance of the outwards sampling signal and causing the second emitter to generate a so-called inwards sampling signal;

said first receiver detects the appearance of the inwards sampling signal and causing the first emitter to let the outwards sampling signal relapse;

said second receiver detects the relapse of the outwards sampling signal and signals the second means to enable the passage of data, whereby the data are simultaneously recorded by the peripheral unit while the first means check said data;

said second emitter causes the inwards sampling signal to relapse and a so-called inwards transfer signal to appear;

said first receiver detects the relapse of the inwards sampling signal and causes the first emitter to let a so-called outwards transfer signal fall;

said second receiver detects the fall of the outwards transfer signal and causes the second emitter to let the inwards transfer signal relapse;

said first receiver detects the relapse of the inwards transfer signal and causes the first emitter to make the outward transfer signal reappear whereby a new cycle can be undertaken.

14. A device for control of transmission of data between a central processor and at least one peripheral unit through a transmission channel, said device comprising:

a first data transmission control circuit connected to said central processor, said first circuit including a first emitter and a first receiver;

a second data transmission control circuit connected to a peripheral unit, said second circuit including a second emitter and a second receiver;

said first emitter coupled to said second receiver for sending control signals to said second receiver in a so-called outwards or write direction, said second emitter coupled to said first receiver for sending control signals to said first receiver in a so-called inwards or read direction, said first and second circuits cooperating so as to exchange a cycle of data transmission control signals comprising:

a first sequence comprising information relative to the direction of the transmission and the addressing of the data to be transmitted, and a second sequence of transmission of these data through said transmission channel;

first means for checking data transmitted in said write direction and for signaling said second emitter to send to said first receiver an error signal which causes an initialization of said cycle of control signals; and second means responsive to said second emitter for enabling the passage of the information or the data through said channel; wherein said emitters and said receivers cooperate to exchange signals during said second sequence for a direction of transmission known as the inwards or read direction, said cooperation comprising:

said first receiver detects the fall of a so-called inwards check signal and causes the first emitter to let a so-called outwards transfer signal fall;

said second receiver detects the fall of the outwards transfer signal and causes the second emitter to make a so-called inwards transfer signal appear, and a so-called inwards sampling signal appear while the data to be transferred is positioned at an input to said channel;

said first receiver detects the appearance of the inwards sampling signal and causes the first emitter to make a so-called outwards sampling signal appear;

said second receiver detects the appearance of the outwards sampling signal and causes the second emitter to let the inwards sampling signal relapse;

said first receiver detects the relapse of the inwards sampling signal and causes the first emitter to let the outwards sampling signal relapse, while the second means enables the passage of data whereby the data are recorded by the central processor;

said second receiver detects the relapse of the outwards sampling signal and causes the second emitter to let the inwards transfer signal relapse;

said first receiver detects the relapse of the inwards transfer signal and causes the first emitter to make the outwards transfer signal reappear, whereby a new cycle can be undertaken.

15. A device as recited in claim 14, whereby said emitters and said receivers cooperate to exchange signals during the second so-called write sequence when the first means detects an error in the data sent to the peripheral unit, said cooperation comprising:

said second emitter, while causing the inwards sampling signal to relapse also causes the inwards transfer signal to reappear and also generates an error signal;

said first receiver detects the reappearance of the inwards transfer signal and causes the first emitter to let the outwards transfer signal relapse;

said second receiver detects the relapse of the outwards transfer signal and causes the second emitter to make the inwards check signal reappear;

said first receiver detects the reappearance of the inwards check signal and causes the first emitter to make the outward check signal appear;

said second receiver detects the appearance of the outwards check signal and causes the first emitter to let the inwards check signal relapse;

said first receiver detects the relapse of the inwards check signal and allows the central processor to receive the error signal;

said first receiver causes the first emitter to let the outwards check signal relapse;

said second receiver detects the relapse of the outwards check signal and causes the second emitter to let the inwards transfer signal relapse;

said first receiver detects the relapse of the inwards transfer signal and causes the first emitter to make the outwards transfer signal reappear whereby a new cycle can be undertaken.

* * * * *